(12) United States Patent
Brittain et al.

(10) Patent No.: US 6,195,098 B1
(45) Date of Patent: *Feb. 27, 2001

(54) SYSTEM AND METHOD FOR INTERACTIVE RENDERING OF THREE DIMENSIONAL OBJECTS

(75) Inventors: Donald Lee Brittain, Santa Barbara, CA (US); Rolf Walter Berteig, Seattle, WA (US); Daniel David Silva, San Rafael, CA (US); Thomas Dene Hudson, Port Washington, WI (US); Gary S. Yost, San Francisco, CA (US)

(73) Assignee: Autodesk, Inc., San Rafael, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,825

(22) Filed: Jul. 31, 1997

Related U.S. Application Data

(60) Provisional application No. 60/025,117, filed on Aug. 2, 1996.

(51) Int. Cl.[7] .................................................. G06T 15/40
(52) U.S. Cl. ........................... 345/422; 345/420; 345/435
(58) Field of Search ..................................... 345/422, 420, 345/435; 364/468.04

(56) References Cited

PUBLICATIONS

James D. Foley, et al., Computer Graphics, 1990, section 15.2.3 "Extents and Bounding Volumes", pp. 660–663, 1990.*

Matthew Regan et al, "Priority Rendering with a Virtual Reality Address Recalculation Pipeline", Computer Graphics Proceedings, Annual Conference Series, 1994, pp. 155–162), Jul. 24, 1994.*

Kinetix, Studio 3D Max, 1996, Autodesk, Inc., Mar. 15, 1996.*

Munro et al. "Direct Manipulation of Authoring of Object Behavior in an Interactive Graphical Modeling Environment", 1990, IEEE International Conference on Systems, Man and Cybernetics, pp. 660–662, Nov. 4, 1990.*

McKenna et al. Swivel 3D Professional User's Guide. Chapter 4, Links and Constraints, pp. 4–1 tp 4–16, 1990.*

* cited by examiner

*Primary Examiner*—Mark Zimmerman
*Assistant Examiner*—Philip H. Stevenson
(74) *Attorney, Agent, or Firm*—Hickman Palermo Truong & Becker LLP

(57) ABSTRACT

An interactive rendering system which can minimize computational demand while allowing a designer to manipulate one or more selected objects in a scene is disclosed. A scene is rendered to a scene buffer. One or more objects are selected and rendered to an object buffer. The scene is re-rendered to the scene buffer without the selected objects. As the selected objects move or change, they are re-rendered only in the object buffer and a display is generated by merging the objects buffer and the scene buffer. Because there is no need to render the background scene, most of the computational power can be dedicated to the selected objects. The perspective and depth relationship between the selected objects and the scene are maintained.

22 Claims, 3 Drawing Sheets

SYSTEM AND METHOD FOR INTERACTIVE RENDERING OF THREE DIMENSIONAL OBJECTS

RELATED APPLICATIONS

This application claims the benefit of U.S. Provisional Pat. Application No. 60/025,117, entitled, "Three Dimensional Modeling and Animation System," filed Aug. 2, 1996, by inventors Rolf Walter Berteig, Daniel David Silva, Donald Lee Brittain, Thomas Dene Hudson, and Gary S. Yost, which is incorporated herein by reference.

COPYRIGHT DISCLAIMER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF INVENTION

1. Field of the Invention

The present invention relates to the field of three-dimensional computer graphics, and more particularly to a system and method for manipulating and rendering of selected three-dimensional objects within a scene using a computer.

2. Related Art

The advances in Personal Computer ("PC") technology have made possible the introduction of relatively inexpensive workstations for word processing, accounting, graphical design and other similar applications which previously required dedicated workstations. The use of PC-Based workstations for visualization of three dimensional objects set in three-dimensional space has traditionally been hindered by the demands placed by existing software on the computers. The complex mathematical operations required for correctly drawing and rendering three-dimensional objects including hidden surface removal, application of texture, lighting, shadows, and animating the three-dimensional objects makes heavy demands on the PCs used for this purpose. Typically, the PC-based systems were designed to defer most of the detailed rendering to after the design was complete. Although this compromise improved the performance of the systems, a graphic designer was not able to view a substantially accurate representation of the final scene while designing the scene.

Computational demands placed on PCs are particularly severe when one or more objects located in a complex scene are being manipulated by the designer. In a conventional system, the entire scene is rendered continually while the objects are being manipulated by the designer. As a result, even if most of the scene is not affected by manipulation of the selected object or objects, the entire scene must be updated to account for the movement of the selected objects and their effects on the scene. The computational demand may exceed the ability of many PCs.

It is therefore desirable to provide a system that will minimize the computational requirements for rendering a scene in which one or more selected objects are being manipulated within the scene.

SUMMARY OF THE INVENTION

One embodiment of the invention includes an interactive rendering system which can minimize computational demand while allowing a designer to manipulate one or more selected objects in a scene. One aspect of the present invention is a system which continuously renders the selected objects while the background scene is not continuously rendered. Because there is no need to render the background scene, most of the computational power can be dedicated to the selected objects. In order to give a designer as realistic a view as possible, the perspective and depth relationship between the selected objects and the scene are maintained. It is found that many designers are satisfied with this arrangement.

The present invention is a system for rendering one or more selected three-dimensional objects of a scene containing a plurality of three-dimensional objects. In one embodiment of the present invention, each object is associated with a modifier stack containing digital information describing the appearance of the object. The selected object(s) can be separated from the rest of the objects in the scene by using a flag. The system comprises a rendering engine for generating two-dimensional pixel data for the modifier stacks of objects. The pixel data includes z values corresponding to a distance between the objects and a predetermined point in space. A first video buffer is coupled to the rendering engine for receiving two dimensional pixel data generated by the rendering engine operating on objects in the scene that are not selected. A second video buffer is coupled to the rendering engine for receiving two dimensional pixel data generated by the rendering engine operating on selected objects. The system then compares the z values of pixels in the first and second video buffers and selects the z value which is closest to the predetermined point. Either the data in the scene video buffer or object video buffer will be displayed depending on whether a selected z value comes from the scene video buffer or object video buffer.

To further explain the present invention, it should be noted that rendering involves transforming three dimensional representation of objects in a scene on a two dimensional screen. Each pixel on the screen represents a point in three-dimensional space which has a depth or "z" dimension representing the distance of that point from an observer. When two points in three dimensional space are mapped to the same pixel by the system, the point with the smaller z value is displayed while the point with the larger z value is obscured and therefore not drawn on the screen. The system of this invention maintains a buffer containing, among other information, the z values of every pixel in the scene. The information is used to correctly display selected objects in the scene in relation to the background and other objects in the scene without rendering the entire scene when one of the objects in the scene is being manipulated by the designer.

When a designer begins manipulating one or more selected objects in the scene, the selected objects are flagged and re-rendered frequently while it is being manipulated by the designer. The z values of the selected objects are stored in a separate buffer. The remainder of the scene (with the select objects removed) is rendered once, and is not changed while the objects are being manipulated and therefore the computation requirements for re-rendering are limited to that which is required to correctly render the selected objects and manipulated by the designer and to correctly display the manipulated object in relation to the background and other objects.

While the object is manipulated within the scene, the z values for the pixels of the manipulated object are compared with the z values of the pixels in the scene and each pixel in the manipulated object or objects is displayed either in front of or behind the scene by comparing the z values of the objects' pixels to those contained in the buffer for the remainder of the scene. The use of the z values eliminates the need for re-rendering any portion of the scene which is not changed by the manipulation of the selected object by the designer and therefore significantly reduces the computational complexity of displaying the scene in rendered form while the designer is manipulating an object within the scene.

When the manipulation of the selected objects is completed and the designer releases the objects, typically by releasing the mouse button, the system integrates the manipulated objects back into the existing background scene without the necessity of re-rendering the entire scene by using the values stored in the z buffer reserved for the selected objects.

It should be noted that the input to the rendering engine does not have to be the modifier stack of an object. The present invention is applicable to other ways to represent three-dimensional objects in a scene. Further, it is not essential to use flags to separate selected objects from the scene, as long as the rendering engine can distinguish the status of the objects so that the selected object(s) and the objects of the scene can be separately rendered and delivered to the two video buffers.

These and other objects, features and advantages of the invention will be apparent from the following description which should be read in light of the accompanying drawings in which the corresponding referenced numerals refer to corresponding parts throughout several views.

DETAILED DESCRIPTION OF THE INVENTION

The present invention involves a novel interactive rendering system and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
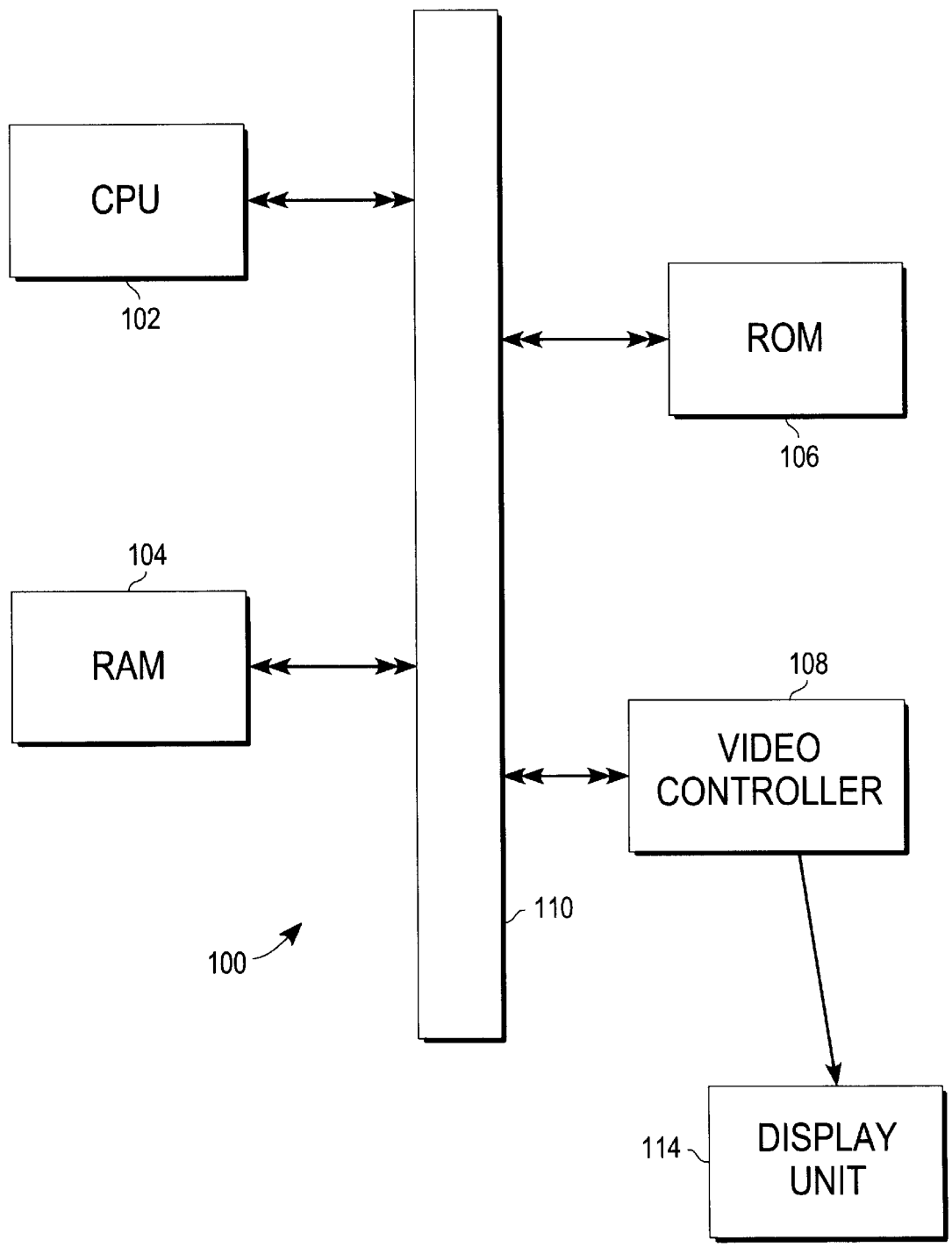
FIG. 1 is a block diagram of a workstation that can be used to implement an interactive rendering system of the present invention.

FIG. 1 illustrates a workstation 100 that can be used to implement the present invention. It comprises a central processing unit (CPU) 102, a random access memory (RAM) 104, a read-only-memory (ROM) 106, and a video controller 108. These components can communicate with each other via a bus 110. Workstation 100 also contains a display unit 114. Workstation 100 can be used to execute software which renders three-dimensional representation of a scene on a two dimensional screen on display unit 114. In the present application, the process of calculating the correct two dimensional screen representation of the a three-dimensional scene is called "rendering". The scene may be updated continuously to permit a user to observe the effects of any changes introduced into the scenes by the user.

The screen of display unit 114 is composed of two dimensional picture elements or "pixels". Even though the pixels are addressed in the two dimensional space of the screen, they each represent a point in three-dimensional space which has a depth or "z" dimension representing the distance of that point from an observer (which could be the designer using the workstation). When two points in three dimensional space are mapped to the same pixel by the rendering system, the point with the smaller z value is displayed while the point with the larger z value is obscured and therefore not drawn on the screen.

An example of rendering is now described. In this example, two objects, e.g., a car and a person, are initially located close to each other and at about the same distance from the observer. When this scene is initially rendered, the z values of the car and the person are about the same. Because the car and the person are separated from (although close to) each other, all the pixels representing the car and the person can be seen by the observer. If the person is moved towards the observer, it will appear to be bigger than the car as a result of change in perspective. Part of the car should be blocked by the person in a proper perspective view. When the car and the person are rendered, the overlapping portion will be mapped into the same pixels. When the scene is displayed by display unit 114, part of the car will be obscured by the person because the z values of the pixels corresponding to the person are smaller than the z values of the pixels corresponding to the car.

It is found that many workstations do not have enough computational power to continuously render a scene when one or more objects are manipulated. One aspect of the present invention is to continuously render selected objects while the background scene is not continuously rendered. Because there is no need to render the background scene, most of the computational power can be dedicated to rendering and manipulating the selected objects. In order to give a designer as realistic a view as possible, the z values of the selected objects are compared to the z values of the background scene so that the depth relationship can be maintained.

Figure 2:
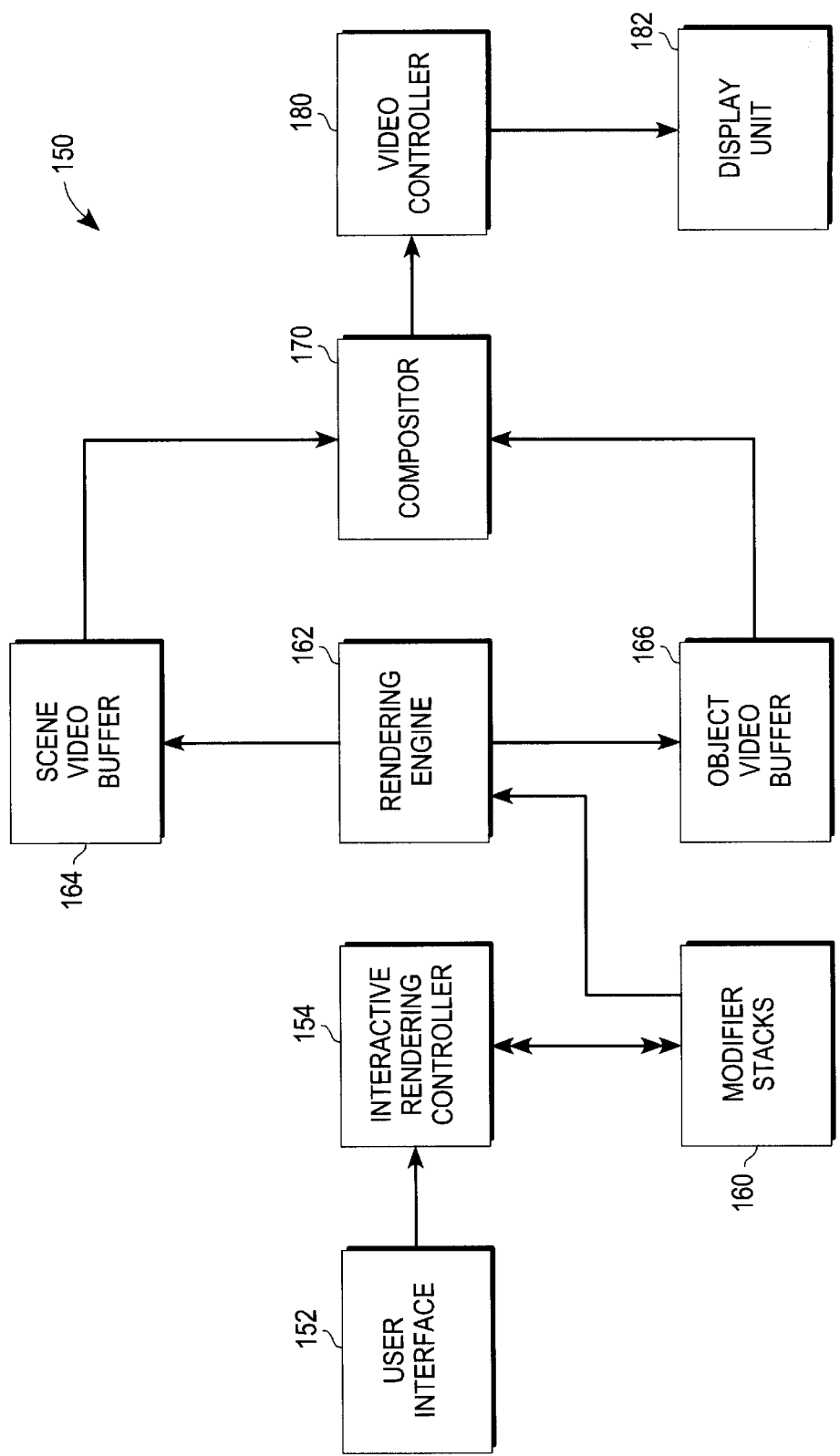
FIG. 2 is a block diagram showing the details of the interactive rendering system of the present invention.

FIG. 2 is a block diagram of an interactive rendering system 150 of the present invention. System 150 comprises a memory area 160 for storing information about the three-dimensional appearance of all the objects in a scene. Relevant information may include a modifier stack structure disclosed in an appendix of the present application. Memory area 160 is preferably located in RAM 104 of workstation 100. However, memory area 160 could also be a portion of a hard disk, although the performance of the system may be degraded because of slow data retrieval.

System 150 also comprises a rendering engine 162 that performs rendering operation. Rendering engine 162 is preferably a software module loaded in RAM 104 or stored in ROM 106. As explained before, a rendering operation involves calculating the correct two dimensional screen representation of three-dimensional objects. Rendering engine 162 obtains information on the objects of the scene from memory area 160. After rendering, the two dimensional representation of the scene is stored in a scene video buffer 164. In one embodiment of the present invention, the two-dimensional information includes the z value and the pixel color value (typically in the form of B (blue) R (red) and G (green) for each pixel). Scene video buffer 162 may be located in RAM 104 or in a graphic card commonly used to speed up graphic display of a workstation.

The pixels are displayed on a display unit 182, which typically accepts sequential input signals having a predetermined frequency and bandwidth (or data rate). These input signals conform to a predefined video format (e.g., VGA, SVGA, etc.). As a result, a video controller 180 is used to convert the two dimensional digital data in scene video buffer 164 to appropriate video signals. Video controller 180 and display unit 182 are substantially the same as video controller 108 and display unit 114 of FIG. 1. Both video controller 180 and scene video buffer 162 may be located in the above mentioned graphic card.

In the present system, the designer can designate one or a group of objects in the above described scene for manipulation. System 150 comprises a user interface 152 which allows the assigner to select the objects of interest. User interface 152 is preferably a software module loaded in RAM 104 or stored in ROM 106. The selection can be entered by using a mouse (not shown) and/or a keyboard (not shown). As an example, the user can select an object or a group of objects for manipulation by holding down a predetermined button of the mouse and/or key of the keyboard. The selection is transmitted to an interactive rendering controller 154.

Upon receiving the identity of the selected object(s) from user interface 152, controller 154 flags those objects that are selected (e.g., using a conventional flag typically used in software design). The designer can manipulate (e.g., move, bend, or otherwise modify) the selected object(s). In one embodiment of the present invention, the objects which are not selected cannot be modified. As a result, there is no need to continuously render the scene. The scene with the selected objects removed will be rendered once, and the resulting two-dimensional data is stored in scene video buffer 164 for future uses.

In the present invention, rendering engine 162 continuously renders the object(s) that are selected. The resulting two-dimensional data is stored in an object video buffer 166. Object video buffer 166 could be a part of RAM 104 or a part of the above mentioned graphic card. As the selected object (s) is being manipulated, the modified object(s) is rendered by rendering engine 162 and the result stored in object video buffer 166. In one embodiment of the present invention, the size and structure of scene video buffer 164 and object video buffer 166 are the same.

System 150 also contains a compositor 170 which merges data in scene video buffer 164 and object video buffer 166. Specifically, the z values of the pixels in object video buffer 166 are compared with the z values of the corresponding pixels in scene video buffer 164. Each pixel in the selected object(s) is displayed either in front of, or behind, or intersecting the pixel in the scene by comparing the z value of the pixel in object video buffer 166 to the pixel in scene video buffer 164. The use of the z buffer eliminates the need for re-rendering of the scene. This leads to significant reduction of the computational complexity of displaying the scene in rendered form while the designer is manipulating an object within the scene.

In one embodiment of the present invention, the modifier stack of each object contains a description of a bounding box that encloses the object. In this case, compositor 170 only needs to compare the z values of pixels within the bounding box of the selected object. In some graphic design situations, the size of the selected object(s) is a small fraction of the whole scene. As a result, only a small number of pixels needs to be evaluated by compositor 170.

The merged data is then sent to video controller 180 for converting to video signals suitable for use by display unit 182.

It is possible that the selected object(s) has some predefined relationship with some of the objects in the scene. For example, the selected object(s) and another object in the scene may be linked together by the same "bend" modifier (i.e., the bending action of one object affects the other object). There are different ways to handle this situation. One way is to prohibit the selected object(s) from using this modifier. Another way is to change just that object in the scene. The exact way to handle this situation is a software design choice, and should not affect the scope of the present invention.

Figure 3:
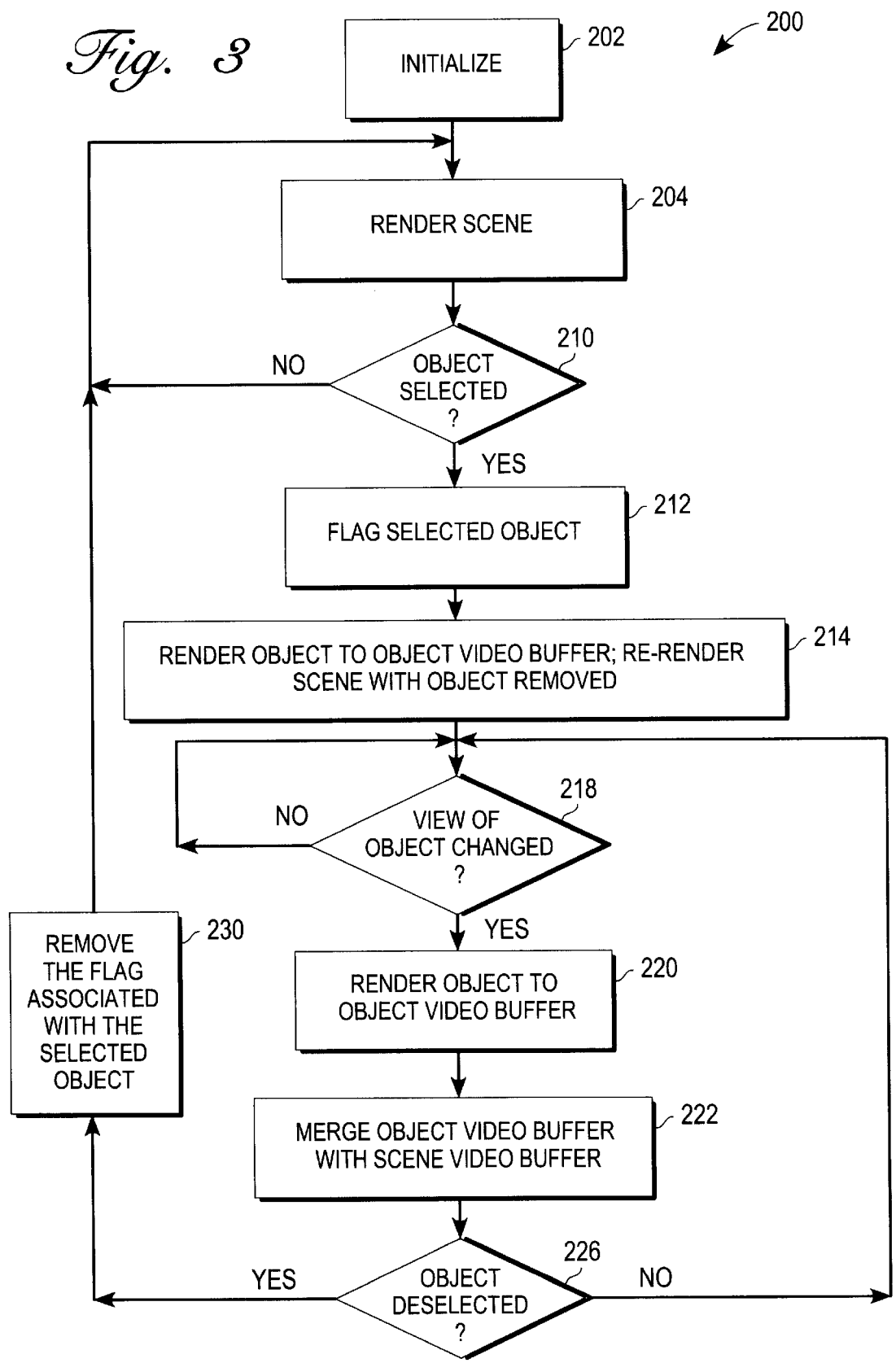
FIG. 3 is a flow chart showing the operation of the interactive rendering system shown in FIG. 2.

The operation of interactive rendering system 150 of FIG. 2 is shown in a flow chart 200 in FIG. 3. In step 202, system 150 is initialized, e.g., bringing up a file containing a scene the designer wishes to render. Appropriate information about the objects (e.g., their modifier stacks) is used by rendering engine 162 to render the complete scene (step 204). The scene is displayed by display unit 182.

System 150 then determines whether any object is selected (step 210). In one embodiment, selection is indicated by the designer holding down a mouse button when a cursor is located within the boundary of a desired object. If no object is selected, system 150 continues to render the scene (i.e., flow chart 200 branches back to step 204). If an object is selected, interactive rendering controller 154 flags the selected objects (step 212). The scene (with the selected object removed) is then rendered. The result is stored in scene video buffer 164. The selected object is also re-rendered and the result is stored in object video buffer 166 (step 214).

In step 218 system 150 determines whether the view of the selected object has been changed (e.g., moved or modified). If the view is not changed, step 218 returns to itself If the view is changed, the selected object is rendered. The result is stored in object video buffer 166 (step 220). Compositor 170 then merges the data in object video buffer 166 and scene video buffer 164 (step 222). As pointed out above, the merging involves, in part, comparing the z values of the rendered object with the corresponding pixels of the scene. The merged data is then sent to video controller 180 for conversion to appropriate video signals.

In step 226, system 150 determines if the object of interest is deselected. In one embodiment of the present invention, deselection is indicated by releasing the mouse button. If the object is deselected, the flag associated with the selected object is removed (step 230). Flow chart 200 then branches to step 204 (i.e., rendering the whole scene continuously). If the object is not deselected, flow chart 200 branches to step 218 to determine if the view of the object has been changed.

It is possible to use the technique disclosed in an appendix of the application entitled "User Selectable Adaptive Degradation for Interactive Computer Rendering System" to render the selected object(s). Stated briefly, the quality of rendering the selected object(s) could be lowered when a desired frame rate cannot be maintained.

While the foregoing invention has been described in reference to its preferred embodiments, it should be understood that various modifications and alterations will occur to those practiced in the art. Such modifications and alterations are intended to fall within the scope of the appended claims.

What is claimed is:

1. A system for rendering a selected three-dimensional object of a scene containing a plurality of three-dimensional objects, each object being associated with a modifier stack, said system comprising:

means for receiving user input that selects for modification one or more of the selected objects, said user input identifying which of the one or more selected objects of said plurality of three-dimensional objects is to be rendered separate from the other objects of said three-dimensional objects;

a rendering engine operating on said modifier stacks for generating pixel data of said modifier stacks, said pixel data including z values corresponding to a distance between said objects associated with the modifier stacks that are operated on and with a predetermined point in space;

a first video buffer coupled to said rendering engine for receiving two dimensional pixel data generated by said rendering engine operating on said modifier stacks of all objects in said scene but excluding any object selected for modification by said user input;

a second video buffer coupled to said rendering engine for receiving two dimensional pixel data generated by said rendering engine operating on said modifier stack of only those objects that are selected for modification by said user input;

wherein the rendering engine is configured to re-render the one or more selected objects only in the second video buffer when the selected object changes; and a compositor configured to compare said z values of pixels in said first and said second video buffers and displaying the scene by merging the first video buffer and the second video buffer by selecting said z values which are closest to said predetermined point.

2. The system recited in claim 1, wherein said modifier stack associated with said one or more selected objects stores information describing a bounding box that encloses said one or more selected objects, and wherein the means for comparing is configured to compare only the z values of pixels in the second video buffer that are within the bounding box.

3. The system recited in claim 1, wherein:

said modifier stack associated with said one or more selected objects stores information describing a bounding box that encloses said one or more selected objects; and the means for comparing comprises a compositor coupled to the first video buffer and to the second video buffer and configured to compare only the z values of pixels in the second video buffer that are within the bounding box.

4. The system recited in claim 1, further comprising a memory that stores information defining a relationship of the one or more selected objects to at least another object in the scene and to a modifier, and wherein the rendering engine is configured to prohibit the one or more selected objects from using the modifier.

5. The system recited in claim 1, further comprising a memory that stores information defining a relationship of the one or more selected objects to at least a second object in the scene and to a modifier, and wherein the rendering engine is configured to permit the one or more selected objects to use the modifier to modify only the second object.

6. A system for rendering one or more selected three-dimensional objects of a scene containing a plurality of three-dimensional objects, each object being associated with a memory area, the system comprising:

a rendering engine operating on the memory areas and generating two-dimensional pixel data of the memory areas, the pixel data including z values corresponding to a distance between the objects associated with the memory areas and a predetermined point in space;

wherein the rendering engine is configured to receive user input that selects for modification one or more selected objects, said user input identifying which objects of said plurality of three-dimensional objects are to be rendered separate from the other objects of said three-dimensional objects;

a first video buffer coupled to the rendering engine and receiving two dimensional pixel data generated by the rendering engine operating on the memory areas associated with all objects in the scene except the one or more selected objects;

a second video buffer coupled to the rendering engine and receiving two dimensional pixel data generated by the rendering engine operating on the memory area associated with only the one or more selected objects;

wherein the rendering engine is configured to re-render the one or more selected objects only in the second video buffer when the one or more selected object changes; and means for comparing the z values of pixels in said first and said second video buffers and displaying the scene by merging the first video buffer and the second video buffer by selecting the z values which are closest to the predetermined point.

7. The system recited in claim 6, wherein each memory area associated with said one or more selected object stores information describing a bounding box that encloses said one or more selected objects, and wherein the means for comparing is configured to compare only the z values of pixels in the second video buffer that are within the bounding box to the unbounded z values of all pixels in the first video buffer.

8. The system recited in claim 6, wherein:

each memory area associated with said one or more selected object stores information describing a bounding box that encloses said one or more selected objects; and the means for comparing comprises a compositor coupled to the first video buffer and to the second video buffer and configured to compare only the z values of pixels in the second video buffer that are within the bounding box.

9. The system recited in claim 6, further comprising a second memory area that stores information defining a relationship of the one or more selected objects to a modifier that also has a relationship to at least another object in the scene, and wherein the rendering engine is configured to prohibit the one or more selected objects from using the modifier by rendering any change to the one or more selected object without giving effect to the modifier.

10. The system recited in claim 6, further comprising a second memory area that stores information defining a relationship of the one or more selected object to a modifier that also has a relationship to at least another object in the scene, and wherein the rendering engine is configured to permit the one or more selected objects to use the modifier to modify the one or more selected object.

11. A method of rendering one or more selected three-dimensional objects of a scene containing a plurality of three-dimensional objects, in which each object is associated with a memory area, the method comprising:

receiving user input that selects for modification one or more selected objects, said user input identifying which one or more objects of said plurality of three-dimensional objects are to be rendered separate from the other objects of said three-dimensional objects;

generating two-dimensional pixel data from the memory areas, in which the pixel data includes z values corresponding to a distance between the objects associated with the memory areas and a predetermined point in space;

receiving and storing, in a first buffer, two-dimensional pixel data generated from the memory areas associated with all objects in the scene except the one or more selected objects, receiving and storing, in a second buffer, two-dimensional pixel data generated only from the memory area associated with only the one or more selected objects, re-rendering the one or more selected objects only in the second video buffer when the one or more selected objects change;

comparing the z values of pixels in said first and said second video buffers; and displaying the scene by merging the first video buffer and the second video buffer by selecting the z values that are closest to the predetermined point.

12. The method recited in claim 11, further comprising:
storing, in each memory area associated with said one or more selected objects, information describing a bounding box that encloses said one or more selected objects; and wherein the step of comparing further includes the steps of comparing only the z values of pixels in the second video buffer that are within the bounding box.

13. The method recited in claim 11, further comprising:
storing, in a second memory area, information defining a relationship of the one or more selected object to at least another object in the scene and to a modifier; and
wherein the step of generating further includes the steps of prohibiting the one or more selected object from using the modifier by rendering any change to the one or more selected objects without giving effect to the modifier.

14. The method recited in claim 11, further comprising:
storing, in a second memory area, information defining a relationship of the one or more selected objects to a modifier that also has a relationship to at least another object in the scene; and
wherein the step of generating further includes the steps of using the modifier to modify only the one or more selected objects.

15. A method of rendering a graphical display, the method comprising:
rendering a scene containing a plurality of three-dimensional objects;
receiving user input that selects for modification one or more selected objects from among the plurality of three-dimensional objects rendered in the scene, wherein the user input identifies which one or more objects of said plurality of three-dimensional objects is to be rendered separate from the other objects of said three-dimensional objects;
rendering the scene, including only the objects other than the one or more selected objects, in a first buffer memory,
rendering only the one or more selected objects in a second buffer memory;
displaying the graphical display by merging the second buffer memory with the first buffer memory.

16. The method recited in claim 15, further comprising the steps of re-rendering only the one or more selected object to the second buffer memory only, when a view of the one or more selected objects has changed.

17. The method recited in claim 15, further comprising the steps of:
associating each of the plurality of objects with a memory area;
generating two-dimensional pixel data from the memory areas, in which the pixel data includes z values corresponding to a distance between the objects associated with the memory areas and a predetermined point in space;
receiving and storing, in a first buffer, two-dimensional pixel data generated from the memory areas associated with all objects in the scene except the one or more selected objects;
receiving and storing, in a second buffer, two-dimensional pixel data generated from the memory area associated with only the one or more selected objects;
re-rendering only the one or more selected object to the second buffer memory only, when a view of the one or more selected objects has changed; and
displaying the scene including the plurality of objects and the one or more selected objects by comparing the z values of pixels in said first and said second video buffers and selecting the z values that are closest to the predetermined point.

18. The method recited in claim 17, further comprising:
storing, in each memory area associated with each one or more selected objects, information describing a bounding box that encloses said one or more selected objects; and wherein the step of comparing further includes the steps of comparing only the z values of pixels in the second video buffer that are within the bounding box to all unbounded z values of pixels in the first video buffer.

19. The method recited in claim 17, further comprising:
storing, in a second memory area, information defining a relationship of the one or more selected object to at least another object in the scene and to a modifier; and
wherein the step of generating further includes the steps of prohibiting the one or more selected objects from using the modifier by rendering any change to the one or more selected objects without giving effect to the modifier.

20. The method recited in claim 17, further comprising:
storing, in a second memory area, information defining a relationship of the one or more selected object and to a modifier that also has a relationship to at least another object in the scene; and
wherein the step of generating further includes the steps of using the modifier to modify only the one or more second objects.

21. A method of modifying a scene that includes a plurality of objects, the method comprising the steps of:
rendering in a single buffer said plurality of objects and displaying the scene;
receiving selection user input that selects a set of one or more object that belong to said plurality of objects, and in response thereto, rendering a background scene by re-rendering said scene without said set of one or more objects, and rendering said set of one or more objects separate from said background scene;

while said set of one or more objects is selected, receiving manipulation input, and in response thereto, creating a revised set of one or more objects by re-rendering said set of one or more objects without re-rendering the background scene, and redisplaying the scene based on said background scene and said revised set of one or more objects.

22. The method of claim 21 further comprising, while said set of one or more objects is selected, receiving de-selection input that de-selects said one or more objects, and in response thereto, re-rendering the scene, including said revised set of one or more objects, in a single buffer.

* * * * *

UNITED STATES PATENT AND TRADEMARK OFFICE
CERTIFICATE OF CORRECTION

PATENT NO. : 6,195,098 B1
DATED : February 27, 2001
INVENTOR(S) : Brittain et al.

It is certified that error appears in the above-identified patent and that said Letters Patent is hereby corrected as shown below:

Claim 7,
Line 2, replace "object" with -- objects --;

Claim 8,
Line 3, replace "object" with -- objects --;

Claim 10,
Line 3, replace "object" with -- objects --;

Claim 13,
Line 3, replace "object" with -- objects --;
Line 6, replace "object" with -- objects --;

Claim 19,
Line 3, replace "object" with -- objects.

Signed and Sealed this

Thirtieth Day of October, 2001

*Attest:*

NICHOLAS P. GODICI
*Attesting Officer*    Acting Director of the United States Patent and Trademark Office